United States Patent
Sugawara

[11] Patent Number: 6,038,360
[45] Date of Patent: Mar. 14, 2000

[54] FIBEROPTIC BLOCK FOR HIGH CONTRAST IMAGING

[75] Inventor: Takeo Sugawara, Hamamatsu, Japan

[73] Assignee: Hamamatsu Photonics K.K., Hamamatsu, Japan

[21] Appl. No.: 08/984,883

[22] Filed: Dec. 4, 1997

[30] Foreign Application Priority Data

Dec. 4, 1996 [JP] Japan ...................................... 8-324343

[51] Int. Cl.⁷ .................................................. G02B 6/08
[52] U.S. Cl. ............................................ 385/120; 385/116
[58] Field of Search ..................................... 385/115, 116, 385/120, 121; 356/71; 382/124, 127

[56] References Cited

U.S. PATENT DOCUMENTS

| | | | |
|---|---|---|---|
| 3,797,910 | 3/1974 | Westwig | 385/120 |
| 3,906,520 | 9/1975 | Phillips | 396/15 |
| 4,932,776 | 6/1990 | Dowling, Jr. et al. | 356/71 |
| 5,426,296 | 6/1995 | Shikai et al. | 250/227.2 |
| 5,448,649 | 9/1995 | Chen et al. | 382/126 |

FOREIGN PATENT DOCUMENTS

| | | |
|---|---|---|
| 0 747 737 | 12/1996 | European Pat. Off. . |
| 7-174947 | 7/1995 | Japan . |

*Primary Examiner*—John D. Lee
*Assistant Examiner*—Michael J. Stahl
*Attorney, Agent, or Firm*—Pillsbury Madison & Sutro LLP

[57] ABSTRACT

The fiberoptic block in accordance with the present invention has an input end face constituted by a combination of a plurality of surfaces each of which is inclined at a slant angle $\alpha$ by which disturbing light from within the air can be eliminated, whereby an irregularity image with a high contrast can be emitted as usual. Also, it has an output end face perpendicular to the axis of each unit fiber. Accordingly, when the output end face is butted against and secured to an input face of a photodetector, the irregularity image is made incident on the input face of the photodetector so as to be substantially perpendicular thereto, thus allowing a bright irregularity image to be attained. Further, since this fiberoptic block has a form extending from the output end face in a direction perpendicular thereto, it can be attached to the photodetector relatively easily with a high precision.

3 Claims, 11 Drawing Sheets

ns so as to determine $\alpha_c$ the above-mentioned range
FIBEROPTIC BLOCK FOR HIGH CONTRAST IMAGING

BACKGROUND OF THE INVENTION

1. Field of the Invention

The present invention relates to a fiberoptic block used as optical image transmitting means in a fingerprint acquisition apparatus or the like.

2. Related Background Art

Figure 11A:
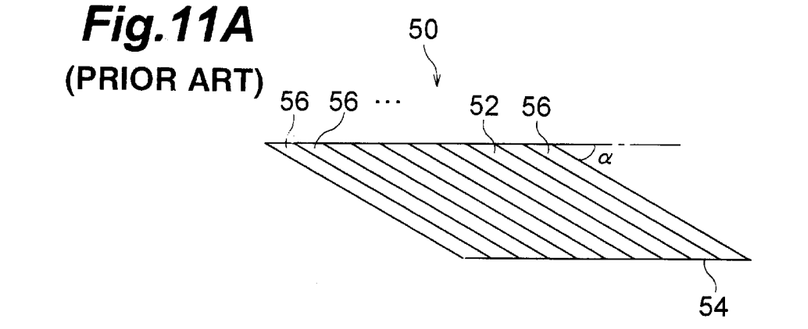
FIG. 11A is a side view showing a conventional FOB 50.
Figure 11B:
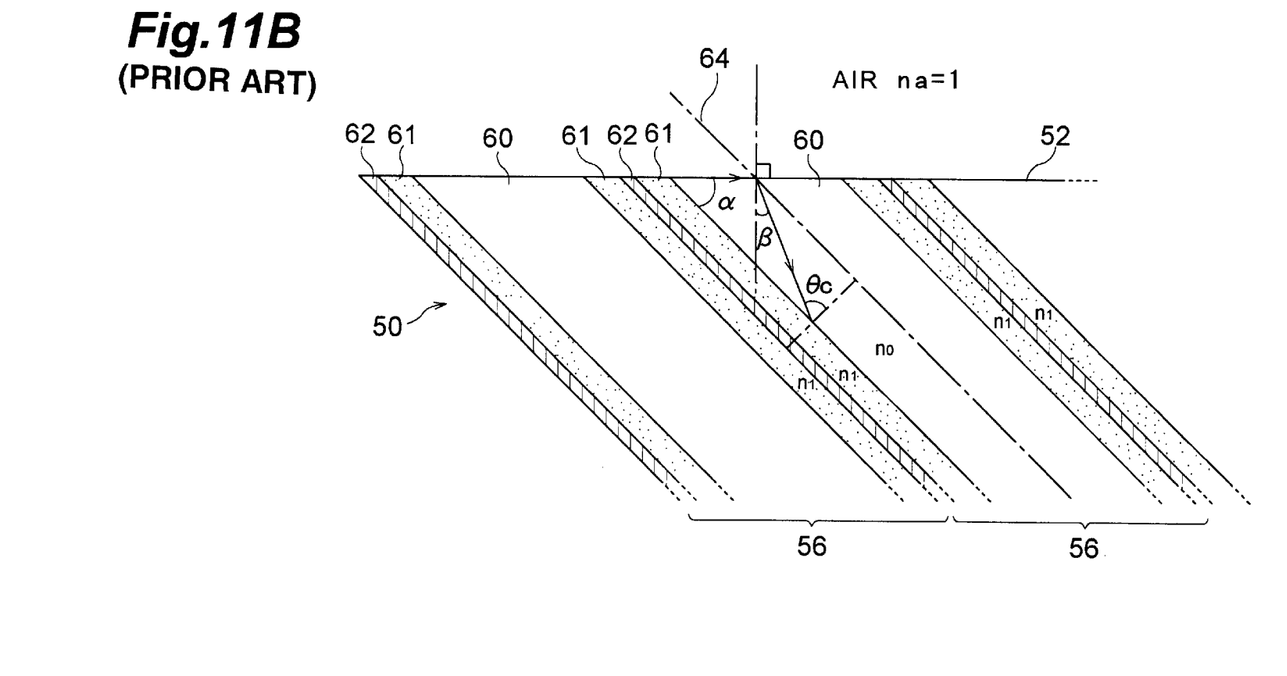
FIG. 11B is an enlarged partially sectional view showing a configuration of the FOB 50.

FIG. 11A is a side view showing a conventional fiberoptic block (referred to as "FOB" hereinafter) 50, whereas Fig. 11B is an enlarged partially sectional view showing a configuration of the FOB 50. This FOB 50 is typically used as irregularity image transmitting means of an apparatus (e.g., fingerprint acquisition apparatus) for detecting an irregularity image formed by irregularities of an object surface.

As shown in FIG. 11A, the FOB 50 has a configuration in which a plurality of optical fibers 56 are bundled together such that their axes are substantially in parallel to each other. These optical fibers, each of which will be referred to as a unit fiber hereinafter, are positioned such that their both end faces are substantially made flush with each other, respectively. Input and output end faces 52 and 54 are respectively used for inputting and outputting an optical image. These end faces, which are in parallel to each other, are respectively formed by thus collected both end faces of the unit fibers. Also, the input and output end faces 52 and 54 are inclined with respect to the axial direction of the unit fibers by an angle $\alpha$. When this FOB 50 is utilized for an irregularity image detecting apparatus, a subject such as a finger is placed on the input end face 52.

As shown in FIG. 11B, each unit fiber 56 comprises a core 60, in its center, serving as a light propagating region; a cladding 61 closely surrounding the core 60; and a light absorber 62 closely surrounding the cladding 61. Both end faces of each unit fiber are inclined with respect to its axis 64 by the angle $\alpha$. In other words, both end faces of each unit fiber are inclined such that the angle formed between a normal of these end faces and the axis 64 becomes (90°−$\alpha$). The angle of inclination (slant angle) $\alpha$ is set to an angle at which, when light is incident on the core 60 from within the air, the incident light is not totally reflected by the interface between the core 60 and the cladding 61. In other words, the slant angle $\alpha$ is set to an angle range in which the angle of incidence of light incident on the core 60 from within the air with respect to the interface between the core and the cladding is not greater than the critical angle at this interface.

As is well-known, such a range of slant angle $\alpha$ can be expressed as $\alpha \leq \alpha_c$ wherein $\alpha_c$ is a specific angle. Here, $\alpha_c$ is an angle satisfying the following three equations:

$n_0 \cdot \sin \theta_c = n_1 \cdot \sin 90°$ (total reflection condition between the core and the cladding)

$n_0 \cdot \sin \beta = n_a \cdot \sin 90°$ (law of refraction between the air and the core)

$\alpha_c + (90° + \beta) + (90° - \theta_c) = 180°$ (sum of interior angles of a triangle)

In the above equations, $n_0$ is a refractive index of the core 60, $n_1$ is a refractive index of the cladding, and $n_a$ is a refractive index of the air. Also, $\theta_c$ is a critical angle at the interface between the core and the cladding, $\beta$ is an angle formed between a normal of the input end face 52 and light (indicated by its corresponding arrow in FIG. 11B) which is incident on the input end face 52 with an incident angle of 90°, i.e., angle of refraction of the incident light with an incident angle of 90°.

When $\theta_c$ and $\beta$ are eliminated from the above three equations so as to determine $\alpha_c$ the above-mentioned range of slant angle $\alpha$ is expressed as:

$$\alpha \leq \alpha_c = \sin^{-1}(n_1/n_0) - \sin^{-1}(n_a/n_0) \quad (1)$$

In the case where, while a subject is placed on the input end face 52, the contact surface of the subject with respect to the input end face 52 is irradiated with illuminating light, a light component made incident on the core 60 of a unit fiber by way of a protruded portion in irregularities of the subject surface which is in contact with the input end face 52 is propagated through the core 60, while being totally reflected by the interface between the core and the cladding, so as to exit from the output end face 54. On the other hand, a light component made incident on the core 60 by way of a depressed portion of the subject surface enters the core 60 after passing through an air layer which exists between the subject surface and the input end face 52. Since the input end face 52 of the FOB 50 is inclined at a slant angle which is within the angle range mentioned above, the latter incident light component is not totally reflected by the interface between the core and the cladding, whereby a part thereof leaks into the cladding 61. In this manner, whenever the incident light from the depressed portion of the subject reaches the interface between the core and the cladding, it partially leaks into the cladding 61 and then is absorbed by the light absorber 62. Consequently, the incident light is gradually attenuated as it advances, thereby failing to reach the output end face 54. Accordingly, only the light component made incident on the input end face 52 by way of the protruded portions of the subject surface can substantially be emitted from the output end face 54. As a result, a bright and dark image with a high contrast corresponding to the irregularities of the subject surface can be obtained.

Figure 12:
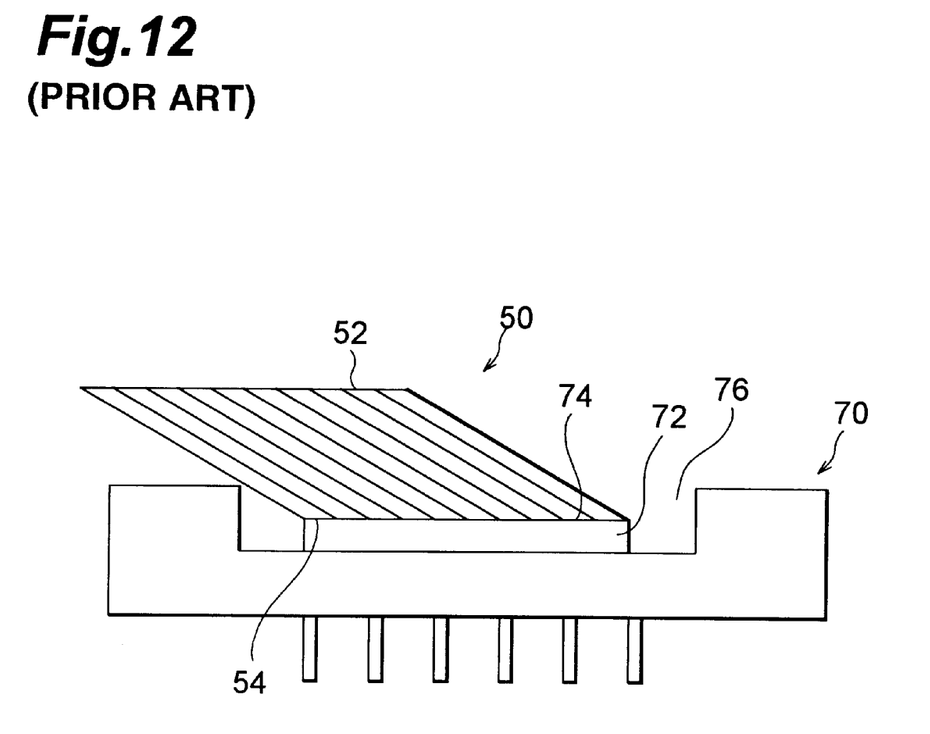
FIG. 12 is a side view showing the FOB 50 attached to a CCD chip 72 of a CCD detector 70.

In the foregoing manner, a bright and dark image (irregularity image) corresponding to the irregularities of the subject surface is transmitted by the FOB 50 so as to be emitted from the output end face 54. Accordingly, as shown in FIG. 12, when the output end face 54 of the FOB 50 is attached to a photodetector (CCD detector 70 in FIG. 12) so as to be butted against the input face of the photodetector (input face 74 of a CCD chip 72 in FIG. 12), an irregularity image of the subject surface can be detected.

In the conventional FOB 50, the output end face 54 is inclined with respect to the axis 64 of the unit fiber. Consequently, when the medium outside the output end face 54 is a medium, such as the air, having a refractive index lower than that of the core 60, total reflection may occur between this medium and the core 60. That is, the light incident on the input end face 52 from the protruded portions of the subject may not be emitted from the output end face 54. Accordingly, in the conventional FOB 50, it is often the case that a sufficiently bright irregularity image is obtained only when the gap between the output end face 54 and the input face 74 of the CCD detector 70 is filled with a matching liquid, a refractive-index-matching adhesive, or the like.

Also, in the conventional FOB 50, since the irregularity image of the subject is substantially emitted along the axis 64 of the unit fiber, it is not emitted perpendicularly to the output end face 54. Accordingly, the irregularity image of the subject is not perpendicularly made incident on the input face 74 of the CCD detector 70, whereby the irregularity image detected by the CCD detector 70 may become dark as a whole.

Further, since the slant angle of the input end face 52 set as mentioned above is typically very small, the cross section of the FOB 50 taken along a plane including the axis 64 of each unit fiber becomes a parallelogram in which lateral sides are greatly inclined with respect to a normal of its base. As a result, the conventional FOB 50 tends to have a larger width, thereby making it difficult to be attached to an input recess 76 of the CCD detector 70. Moreover, since the side faces of the FOB 50 are greatly inclined with respect to the normal of its bottom face, even after being attached to the CCD detector 70, an edge of the FOB 50 is likely to project to a side of the CCD detector 70, for example, whereby a complex device comprising the FOB and the CCD detector tends to become bulky.

In view of the foregoing, it is an object of the present invention to provide a fiberoptic plate which can output a bright irregularity image, can be easily attached to a photodetector, and can keep a compact size even after being attached thereto.

SUMMARY OF THE INVENTION

The present invention provides an FOB comprising a plurality of unit fibers which are bundled together such that respective axes thereof are substantially in parallel to each other. Both end faces of the unit fibers are respectively collected together to form input and output end faces of the FOB. Arranged in the input end face are a plurality of ridge portions each having a slope inclined with respect to the axis of the unit fiber. The angle of inclination of the slope of each ridge portion is an angle at which light incident on each unit fiber from within the air by way of this slope is prevented from being propagated through the unit fiber. The output end face is a surface orthogonal to the axis of each unit fiber.

Since the input end face of the FOB in accordance with the present invention is constituted by a surface which is inclined at a slant angle by which the disturbing light from within the air can be prevented from being propagated through the unit fiber, an irregularity image with a high contrast can be transmitted as usual. Also, since the FOB in accordance with the present invention has an output end face perpendicular to the axis of the unit fiber, the direction of emission of the irregularity image of the subject substantially coincides with the normal direction of the output end face, thus allowing the irregularity image to be emitted even without the intervention of a matching liquid or the like between the input face of the photodetector and the output end face of the FOB, which is required in the conventional FOB. Further, since the direction of emission of the irregularity image coincides with the normal direction of the output end face, when the output end face of the FOB is butted against and secured to the input face of the photodetector, the irregularity image is made incident on the input face of the photodetector so as to be substantially perpendicular thereto. As a result, a bright irregularity image can be obtained. Moreover, since the FOB in accordance with the present invention has a form elongated from its output end face in a direction perpendicular thereto, as compared with the conventional FOB, it can be attached to the photodetector relatively easily with a higher precision, while keeping a compact form after being attached thereto.

In the FOB of the present invention, each unit fiber may comprise a core having a predetermined refractive index and serving as a light propagating region, a cladding closely surrounding the core and having a refractive index lower than that of the core, and a light absorber closely surrounding the cladding and absorbing light which has leaked from the core; while the angle of inclination of the slope of each ridge portion constituting the input end face may be an angle at which light incident on each unit fiber from within the air by way of the slope is prevented from being totally reflected within the unit fiber.

In this case, the disturbing light entering the core from within the air is made incident on the interface between the core and the cladding with an angle of incidence not greater than the critical angle, thus failing to satisfy a total reflection condition and at least partially leaking into the cladding. Thus leaked light is absorbed and eliminated by the light absorber surrounding the cladding, whereby the disturbing light from within the air is gradually attenuated and accordingly cannot be propagated to the output end face. Since the disturbing light from within the air is thus eliminated, an irregularity image with a high contrast is emitted from the output end face.

In the FOB of the present invention, each unit fiber may comprise a core having a predetermined refractive index and serving as a light propagating region, and a light absorber closely surrounding the core and absorbing light from the core; while the angle of inclination of the slope of each ridge portion constituting the input end face may be an angle at which light incident on each unit fiber from within the air by way of the slope is caused to advance in a direction deviating from the axial direction of the unit fiber.

Since the unit fiber in this case does not include a cladding, only the light component advancing in the axial direction of the unit fiber can be propagated through the core, whereas light components advancing in the other directions are absorbed and eliminated by the light absorber. The slope of each ridge portion has the above-mentioned angle of inclination, whereby the disturbing light from within the air advances in a direction deviating from the axial direction of the unit fiber. As a result, the disturbing light is absorbed and eliminated by the light absorber, thus failing to be propagated through the unit fiber. Since the disturbing light from within the air is thus eliminated, an irregularity image with a high contrast can be emitted from the output end face.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

DETAILED DESCRIPTION OF THE PREFERRED EMBODIMENTS

In the following, embodiments of the present invention will be explained in detail with reference to the accompanying drawings. Here, in the explanation of the drawings, elements corresponding to each other will be referred to with marks identical to each other without their overlapping descriptions being repeated. Also, the ratios of sizes in the drawings do not always coincide with those in practice.

Figure 1:
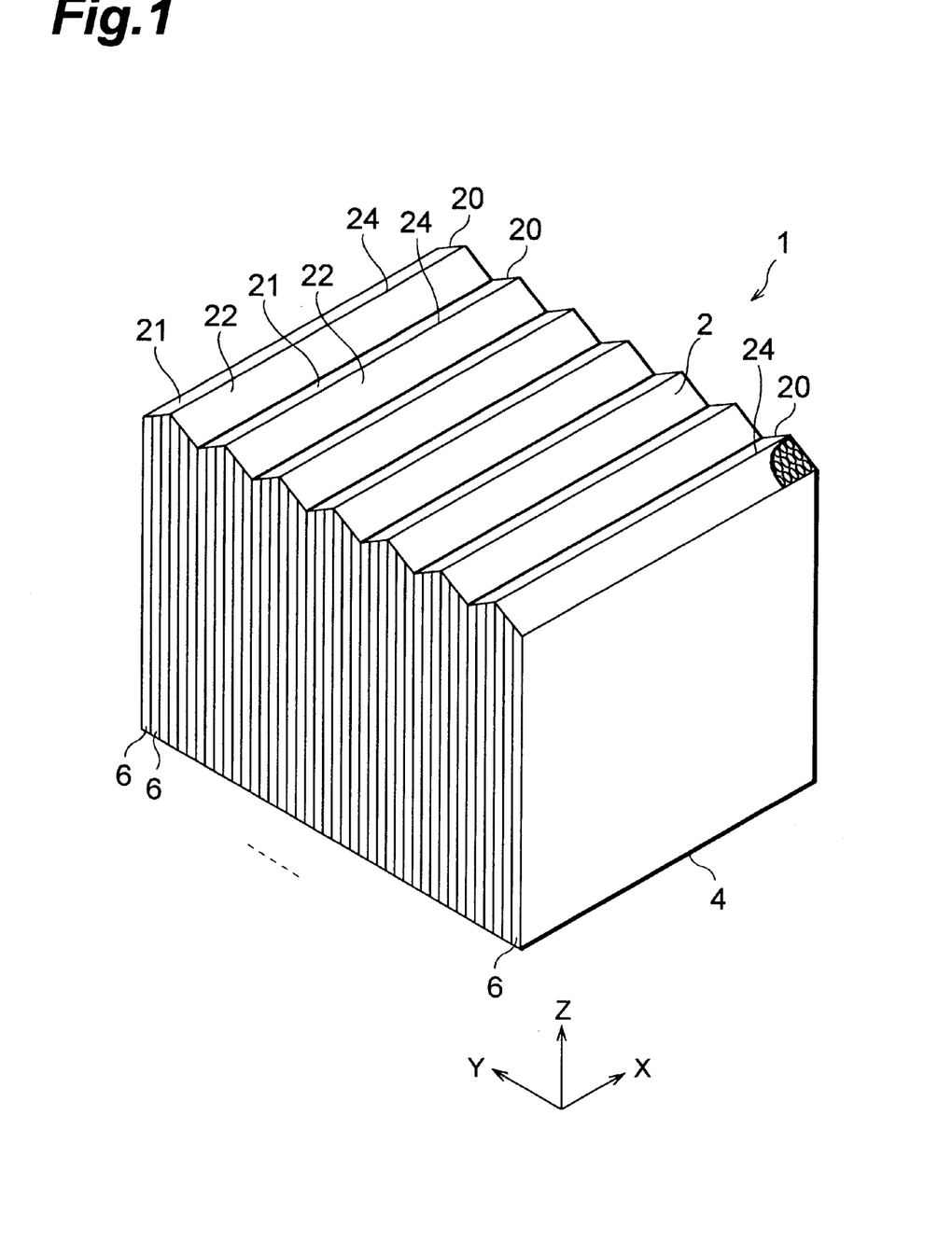
FIG. 1 is an overall perspective view showing an FOB 1 of a first embodiment.

FIG. 1 is a schematic perspective view showing a fiberoptic block (FOB) 1 in accordance with a first embodiment. As with the conventional FOB, the FOB 1 of this embodiment has a configuration in which a plurality of unit fibers 6 are bundled together such that their axes are substantially in parallel to each other. Both end faces of the individual unit fibers 6 are collected to form input and output end faces 2 and 4, respectively. In order to simplify the drawing, the unit fibers 6 are depicted on only one of the two side faces shown in FIG. 1. Also, in the input end face 2, the end faces of the unit fibers 6 are depicted in only a part thereof.

Arranged so as to form the input end face 2 of the FOB 1 in this embodiment, as shown in FIG. 1, are a plurality of long ridge portions 20 each having slopes 21 and 22 inclined with respect to the axis of each unit fiber 6, i.e., slopes which are not orthogonal to the axis of the unit fiber 6. In the XYZ orthogonal coordinate system shown in FIG. 1 in which the axial direction of the unit fibers 6 is taken as Z axis, the ridge portions 20 respectively have apexes 24, each extending in the X-axis direction, which are arranged substantially in parallel to each other with identical intervals along the Y-axis direction. In each ridge portion 20, the slopes 21 and 22 are substantially symmetrical to each other with respect to a plane including the apex 24 which is in parallel to the ZX plane. The output end face 4 of the FOB 1 is a substantially flat surface orthogonal to the axis of each unit fiber 6. In the case where the FOB 1 of this embodiment is used for an irregularity image detecting apparatus such as a finger acquisition apparatus, a subject is placed on the input end face 2, and an irregularity image of the subject is emitted from the output end face 4.

Here, in order to simplify the drawing, the number of unit fibers 6 for each ridge portion 20 and the number of the ridge portions 20 are depicted so as to be smaller than those in the FOB of the present invention actually used in the fingerprint acquisition apparatus or the like.

Figure 2:
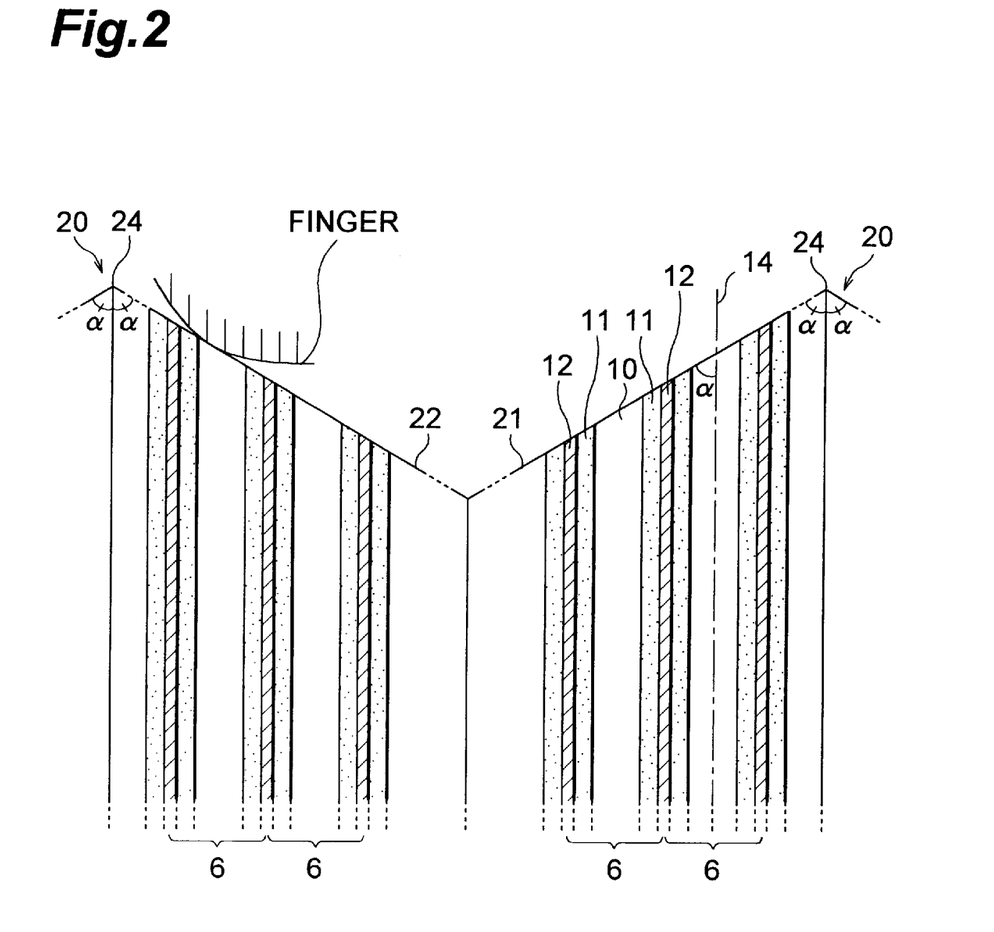
FIG. 2 is an enlarged partially sectional view of the FOB 1.

FIG. 2 is an enlarged partially sectional view of the FOB 1 taken along a plane in parallel to the YZ plane in FIG. 1. As depicted, the unit fiber 6 of this embodiment comprises a core 10, in its center, serving as a light propagating region; a cladding 11 having a refractive index lower than that of the core 10 and closely surrounding the core 10; and a light absorber 12 closely surrounding the cladding 11. When the FOB 1 of this embodiment is used for an irregularity image detecting apparatus, the optical absorber 12 is typically constituted by a material which can absorb a wavelength component of illuminating light with which the subject is irradiated, i.e., material exhibiting a high absorptance with respect to this wavelength component.

One end face of each unit fiber 6 is inclined with respect to its axis 14 by a predetermined acute angle α. In other words, a normal of this end face of the unit fiber 6 and the axis 14 intersect at an acute angle $(90°-\alpha)$. As with the conventional FOB, the angle of inclination (slant angle) α is set to an angle at which, when light is incident on the core 10 from within the air, the incident light is prevented from being totally reflected by the interface between the core 10 and the cladding 11. As mentioned in Related Background Art, the range of slant angle α can be regarded as a range in which the angle of incidence of light incident on the core 10 from within the air with respect to the interface between the core and the cladding is not greater the critical angle at this interface.

This range of slant angle is represented by the following inequality that has already been noted:

$$\alpha \leq \alpha_c = \sin^{-1}(n_1/n_0) - \sin^{-1}(n_a/n_0) \qquad (1)$$

In the following, $\alpha_c$ in the above expression (1) will be referred to as critical slant angle.

Figure 3A:
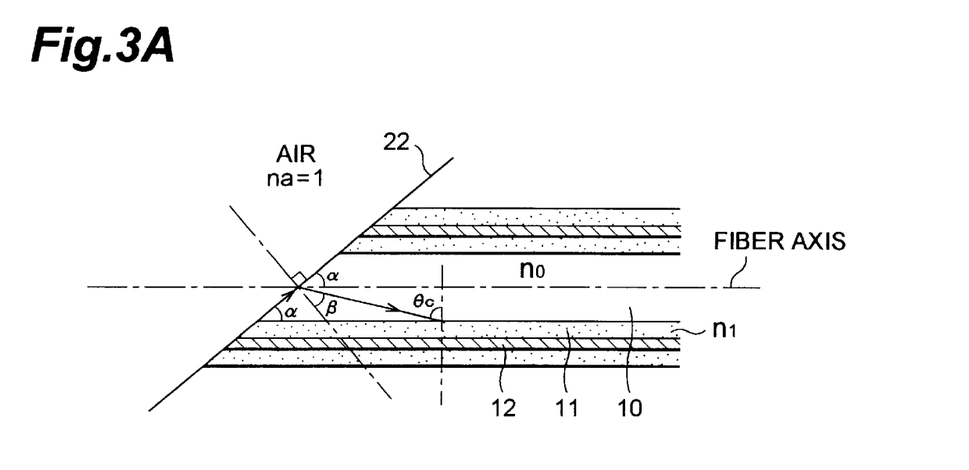
FIG. 3A is an enlarged sectional view of a unit fiber having a cladding.
Figure 3B:
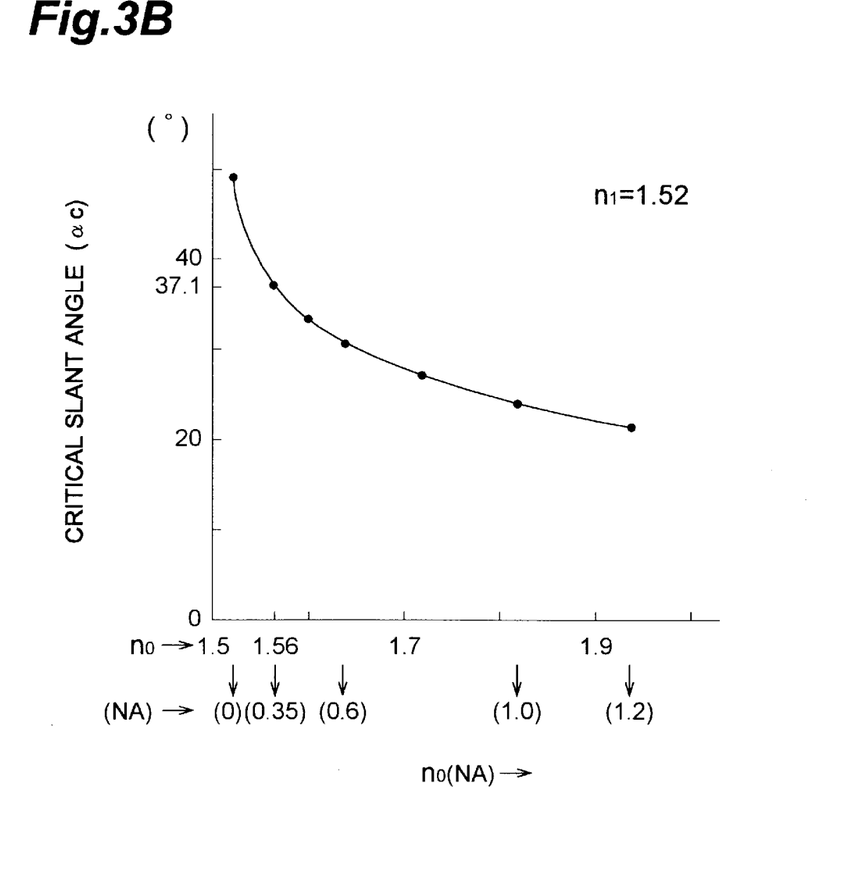
FIG. 3B is a graph showing a relationship between the refractive index of a core 10 and slant angle α in the unit fiber shown in FIG. 3A.

FIGS. 3A and 3B are respectively a drawing and graph for showing a relationship between the refractive index of the core 10 and the above-mentioned critical slant angle $\alpha_c$ in the FOB 1 of this embodiment. In FIG. 3A, α is the slant angle of an end face of a unit fiber, β is the angle of refraction of light incident on the core 10 with an incident angle of 90°, $\theta_c$ is the critical angle at the interface between the core 10 and the cladding 11, $n_0$ is the refractive index of the core 10, $n_1$ is the refractive index of the cladding 11, and $n_a$ is the refractive index of the air. Hereinafter, the refractive index $n_1$ of the cladding will be assumed to be fixed at 1.52. Though FIG. 3A depicts the slope 22, the following observations also hold true for the slope 21.

As shown in FIG. 3B, when the refractive index $n_0$ of the core 10 is 1.56, the critical slant angle $\alpha_c$ becomes 37.1°. Accordingly, when the slant angle α of the end face of each unit fiber is not greater than 37.1°, the disturbing light incident on the core 10 from within the air does not satisfy a total reflection condition, thereby leaking into the cladding 11 and being absorbed and eliminated by the light absorber 12. By contrast, of the light incident on the core 10 by way of a protruded portion of the subject, light components whose incident angle with respect to the cladding 11 from the core 10 is greater than the critical angle $\theta_c$ shown in FIG. 3A are repeatedly totally reflected by the interface between the core and the cladding so as to advance toward the output end face 4, from which it is emitted.

Since the end faces of the individual unit fibers, each of which is inclined at the above-mentioned slant angle α ($\leq \alpha_c$), are collected together to form each of the slopes 21 and 22, these slopes 21 and 22 are also inclined with respect to the axis 14 of each unit fiber by the above-mentioned slant angle α. When the FOB 1 is used for an irregularity image detecting apparatus, as shown in FIG. 2, protruded portions of the subject (finger in FIG. 2) come into contact with the slopes 21 and 22. By contrast, depressed portions of the subject are not in contact with these slopes, thus allowing the air to intervene between the surface of depressed portions and the slopes 21 and 22. When the subject is irradiated with illuminating light in this state, due to the slant angle α imparted to the slopes 21 and 22, as with the conventional FOB, only the light incident on the input end face 2 by way of the protruded portions of the subject is substantially propagated to the output end face 4. Accordingly, an irregularity image with a high contrast is emitted from the output end face 4.

Figure 4:
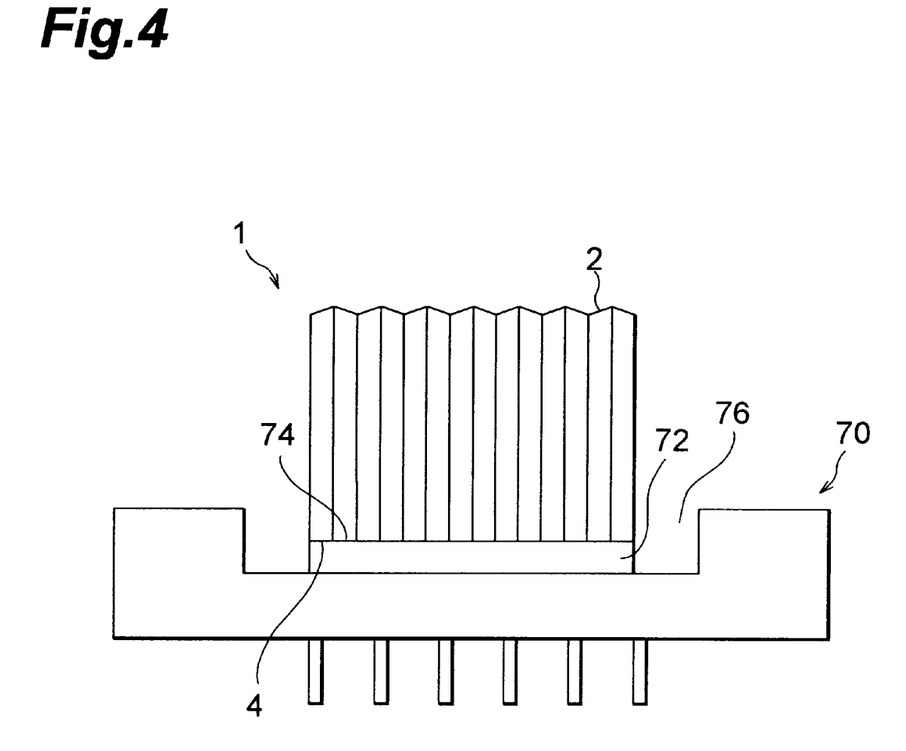
FIG. 4 is a schematic side view showing the FOB 1 attached to a CCD detector 70.

In the following, with reference to FIG. 4, how to attach the FOB 1 to a CCD detector 70 will be explained. FIG. 4 is a schematic side view showing the FOB 1 attached to the CCD detector 70. As depicted, the FOB 1 is secured to the CCD detector 70 when the output end face 4 is bonded to an input face 74 of a CCD chip 72 installed at a recess 76 of the CCD detector 70. When a subject placed on the input end face 2 is irradiated with illuminating light, an irregularity image of the subject is emitted from the output end face 4 and is made incident on the CCD chip 72 through the input face 74. Consequently, the irregularity image of the subject is converted into and outputted as an electric signal. When a signal processing unit and a display unit are successively connected to the CCD detector 70, the irregularity pattern of the subject can be represented on a screen of the display unit.

In this embodiment, as mentioned above, a plurality of ridge portions 20 are arranged so as to form the input end face of the FOB, thereby constituting the input end face by surfaces inclined at a slant angle by which the disturbing light from within the air can be eliminated, while allowing the FOB to obtain an output end face perpendicular to the axis of the unit fiber. Accordingly, unlike the conventional FOB, the direction of emission of the irregularity image of the subject substantially coincides with the normal direction of the output end face 4 in the FOB 1 of this embodiment. Thus, even without the intervention of a matching liquid or the like between the FOB 1 and the input face of the photodetector, the irregularity image can be transmitted from the FOB 1 to the photodetector. Also, since the direction of emission of the irregularity image substantially coincides with the normal direction of the output end face 4, when the FOB 1 is secured to the CCD chip 72 as shown in FIG. 4, the irregularity image is made incident on the input face of the CCD chip 72 so as to be substantially perpendicular thereto. Accordingly, a bright irregularity image can be obtained. Further, since the FOB 1 has a substantially cuboidal form extending from the output end face 4 in a direction perpendicular thereto, it can be attached to the recess 76 of the CCD detector 70 relatively easily with a higher precision, as compared with the conventional FOB.

Though an optical fiber comprising the core 10, cladding 11, and light absorber 12 is used as the unit fiber 6 in this embodiment, a unit fiber comprising the core 10 and light absorber 12 without the cladding may be used instead. The FOB in accordance with the present invention constituted by the latter unit fiber has a configuration similar to that shown in FIG. 2 except that the cladding 11 is excluded therefrom.

Figure 5A:
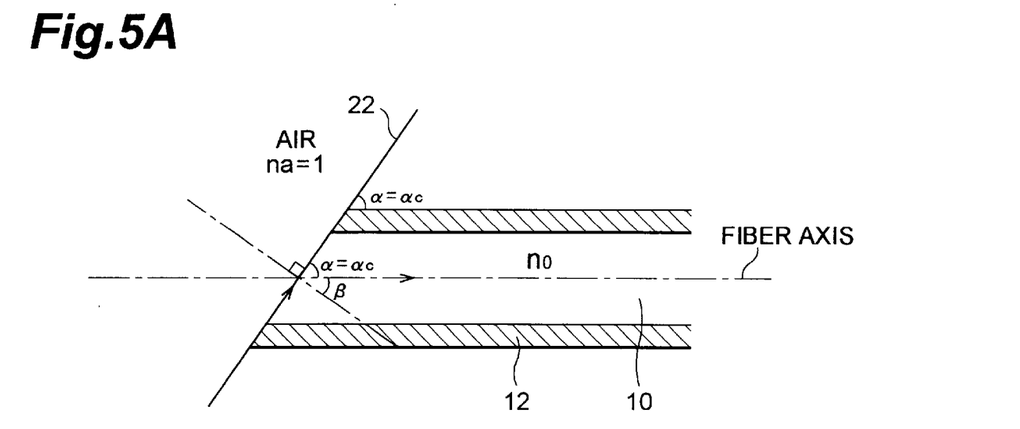
FIG. 5A is an enlarged sectional view of the core 10 in the case where a unit fiber does not include a cladding.
Figure 5B:
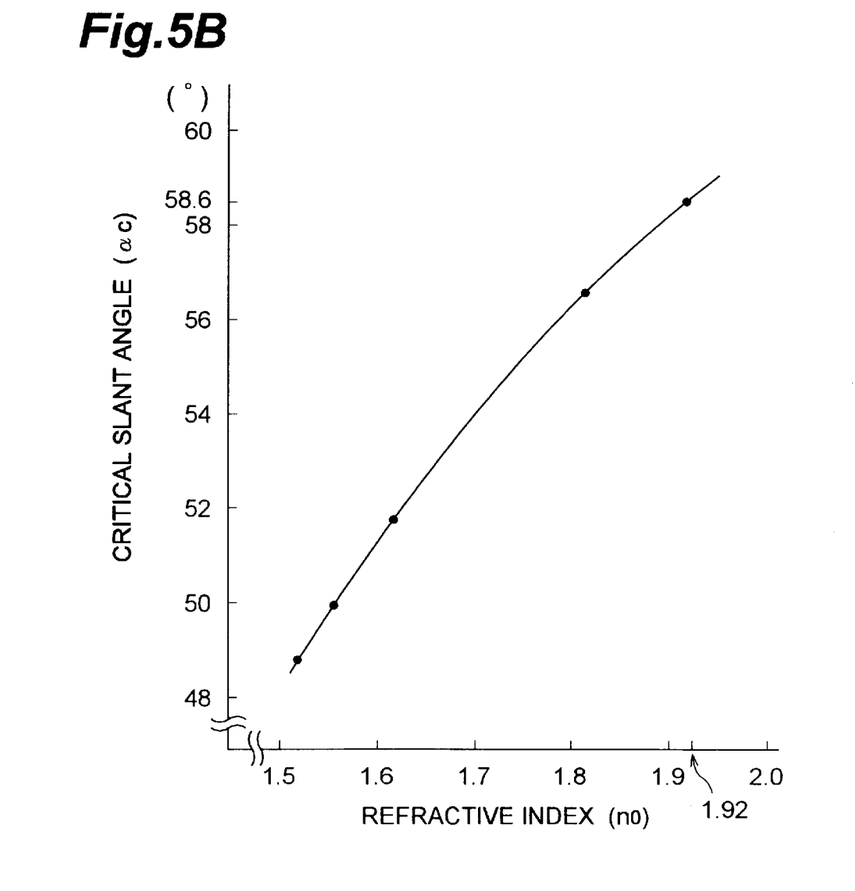
FIG. 5B is a graph showing a relationship between the refractive index of the core 10 and slant angle α in the unit fiber shown in FIG. 5A.

FIGS. 5A and 5B are respectively a drawing and graph for showing a relationship between the refractive index of the core 10 and the above-mentioned critical slant angle $\alpha_c$ in the FOB of the present invention constituted by cladding-free unit fibers. In FIG. 5A, α is the slant angle of an end face of a cladding-free unit fiber, β is the angle of refraction of light incident on the core 10 with an incident angle of 90°, $n_0$ is the refractive index of the core 10, and $n_a$ is the refractive index of the air. Here, FIG. 5A represents the case where the slant angle α is equal to the critical slant angle $\alpha_c$. Though FIG. 5A depicts the slope 22, the following observations also hold true for the slope 21.

The critical slant angle concerning a cladding-free unit fiber slightly differs from that concerning a unit fiber with a cladding. Namely, the critical slant angle concerning the cladding-free unit fiber is an angle at which the light incident on the core with an incident angle of 90° advances in the axial direction of the unit fiber. As can be seen from FIG. 5A, this critical slant angle $\alpha_c$ can be expressed as:

$$\alpha_c = 90° - \beta \qquad (2)$$
$$= 90° - \sin^{-1}(n_a/n_0)$$

Assuming that the angle of refraction β is $\beta_c$ ($=90°-\alpha_c$) when the slant angle α is equal to the critical slant angle $\alpha_c$, the angle of refraction of the light incident on the core 10 from within the air with an incident angle of 90° or less does not exceed $\beta_c$. Accordingly, this incident light advances toward the interface between the core 10 and the light absorber 12 in a direction deviating from the axial direction of the unit fiber, so as to be absorbed and eliminated by the light absorber 12. In the case where the slant angle α is smaller than the critical slant angle $\alpha_c$, all the incident light components with an incident angle of 90° or less exhibit an angle of refraction smaller than $\beta_c$, whereby the whole incident light from within the air is absorbed and eliminated by the light absorber 12. That is, when the slant angle α is not greater than the critical slant angle $\alpha_c$, the incident light from within the air can substantially be prevented from being propagated through the unit fiber.

As shown in FIG. 5B, when the refractive index $n_0$ of the core 10 is 1.92, the critical slant angle $\alpha_c$ becomes 58.6°. Accordingly, when the slant angle α (equal to the slant angle of the slope 22) of the end face of the cladding-free unit fiber is not greater than 58.6°, the disturbing light incident on the core 10 from within the air is absorbed and eliminated by the light absorber 12. On the other hand, of the light incident on the core 10 from the subject, light components advancing in a direction in parallel to the axis of the unit fiber go straight toward the output end face 4, from which it is emitted. Accordingly, in the FOB of the present invention constituted by the cladding-free unit fibers, as with the conventional FOB, only the light incident on the input end face 2 by way of the protruded portions of the subject is substantially propagated to the output end face 4, from which an irregularity image with a high contrast is emitted.

Figure 6A:
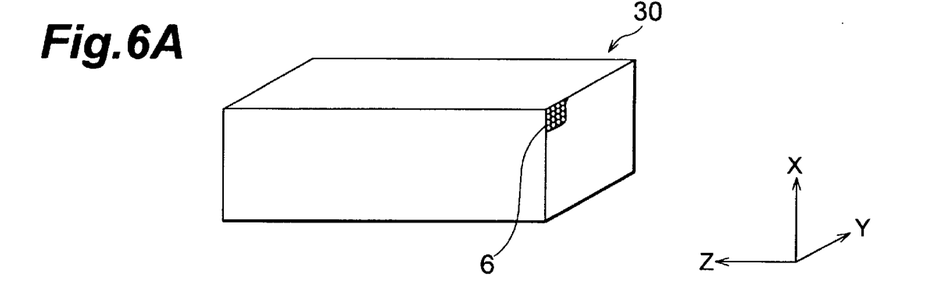
FIGS. 6A to 6E are views showing, step by step, an example of method for making the FOB 1.
Figure 6B:
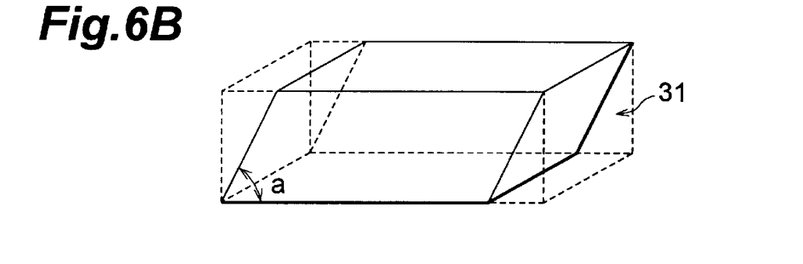
Figure 6C:
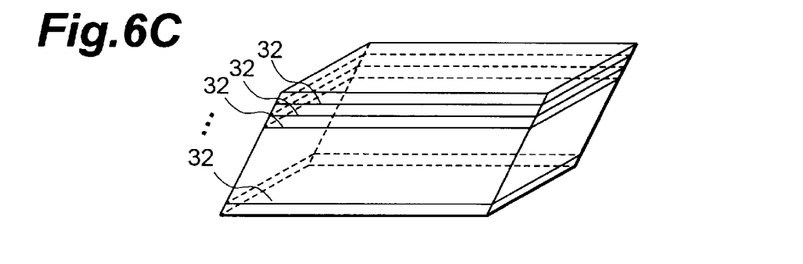
Figure 6D:
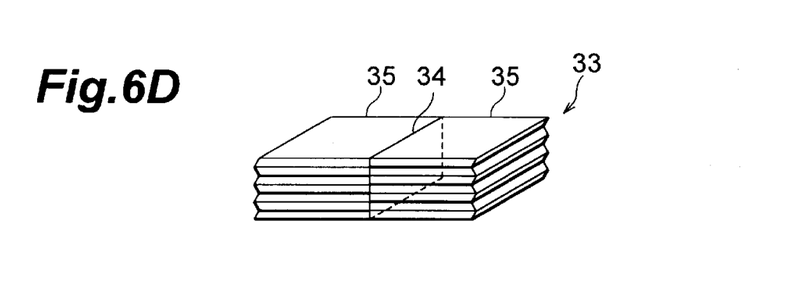
Figure 6E:
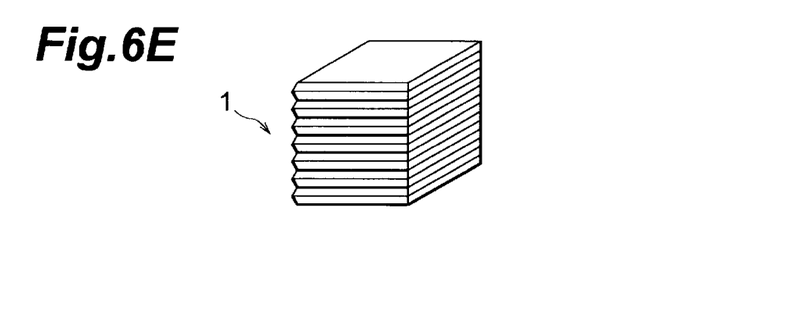

In the following, a method of making the FOB 1 in accordance with this embodiment will be explained. FIGS. 6A to 6E are drawings showing, step by step, an example of method for making the FOB 1. First, in this method, an FOB 30 serving as a base for the FOB 1 is prepared as shown in FIG. 6A. The FOB 30 comprises a plurality of unit fibers 6 integrated into a cuboidal form while being bundled together such that their axes are in parallel to each other. When the XYZ orthogonal coordinate system shown in FIG. 6A is utilized for convenience of explanation, each unit fiber 6 extends in the Z-axis direction. Consequently, the FOB 30 is elongated in the Z-axis direction. Each of two end faces of the FOB 30 respectively formed by both end faces of the collected individual unit fibers is in parallel to the XY plane. In the method explained here, as shown in FIG. 6B, both end portions of the FOB 30 are obliquely cut so as to yield an FOB 31 formed like an oblique prism having as its side face a parallelogram whose one of interior angles is the above-mentioned slant angle $\alpha$ ($\leq \alpha_c$). Subsequently, as shown in FIG. 6C, this FOB 31 is thinly sliced with identical intervals along cutting planes 32 in parallel to the YZ plane. Then, thus obtained plurality of slices of the FOB 31 are bonded together by an adhesive while their sliced faces (corresponding to the respective cutting planes 32) are butted together such that the end faces of adjacent slices are inclined to directions opposite to each other, thereby yielding an FOB 33 having a plurality of ridge portions at each end thereof (FIG. 6D). The adhesive used here is preferably of a light-absorbing black type. Thereafter, as shown in FIG. 6D, the FOB 33 is divided at its center along a cutting plane 34, which is perpendicular to the axis of the unit fibers 6, into two pieces of FOBs 35 each having one end which is a flat surface and the other end provided with a plurality of ridge portions. After the cutting plane 34 is ground in each FOB 35, the FOBs 35 are bonded together by an adhesive such that their cutting planes 34 are made flush with each other, whereby the FOB 1 of this embodiment is obtained (FIG. 6E). The adhesive used here is also preferably of a light-absorbing black type. The FOB 35 by itself may also be used as the FOB of the present invention.

Figure 7:
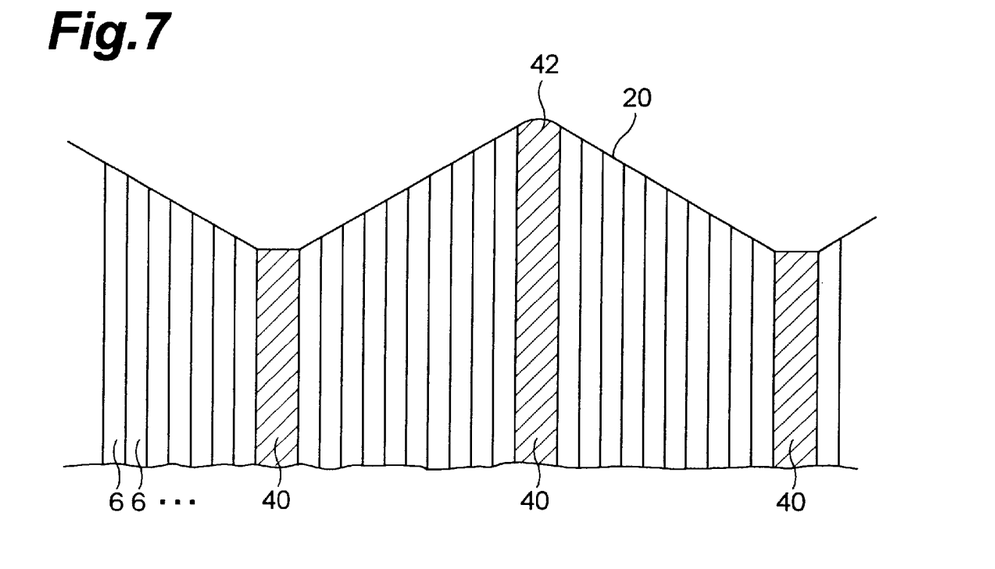
FIG. 7 is an enlarged sectional view showing a configuration of the FOB in accordance with this embodiment made of sliced FOBs which are bonded together.

When an FOB is made by the above-mentioned method, adhesive layers 40 are formed in the FOB with the same intervals as shown in FIG. 7. Also, as depicted, about the half of the adhesive layers 40 form apexes 42 of the ridge portions 20. In the case where each apex 42 is ground to a curved surface (FIG. 7) or a flat surface, it is advantageous in that a finger can be pressed there with a favorable feel while yielding a larger contact area.

When the FOB shown in FIG. 7 is used for fingerprint acquisition, the pitch between the ridge portions 20 is preferably not greater than 200 $\mu$m. Since the fingerprint pitch of an adult is on the order of 400 to 500 $\mu$m, a large contact area can be attained when the pitch of the ridge portions 20 is about the half thereof or shorter. Also, the distance between adjacent unit fibers 6 is preferably not greater than 1/8 of the pitch of the ridge portions 20. In this case, at least two pieces of unit fibers are placed in parallel to each other in the half width of the pitch of the ridge portions 20, whereby irregularities of the subject surface can securely be read out. The thickness of the adhesive layer 40 is preferably not greater than 1/2 of the size of the unit fiber and typically is about 10 $\mu$m. It is due to the fact that a light signal representing the irregularity image may drop out when the adhesive layer 40 is too thick.

Figure 8:
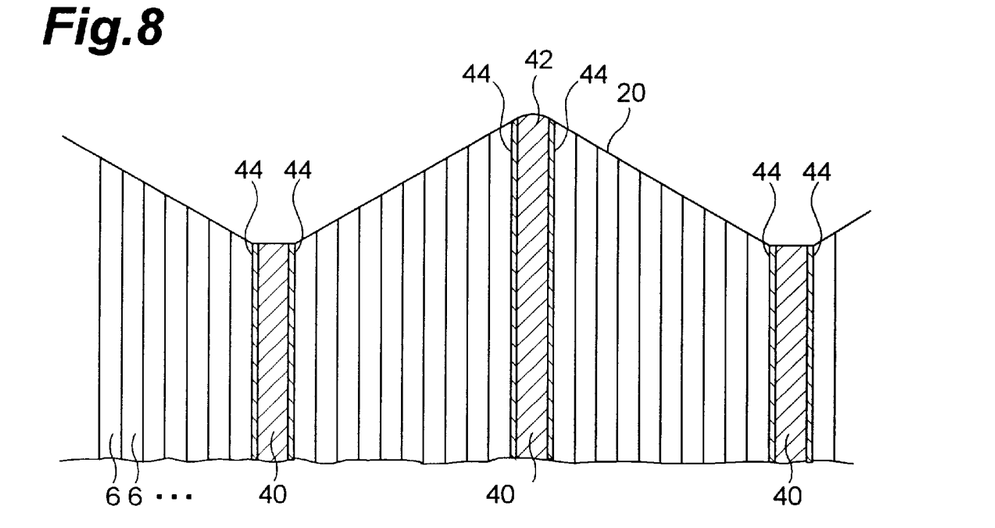
FIG. 8 is an enlarged sectional view showing a configuration of the FOB in accordance with this embodiment made of sliced FOBs each having a sliced surface coated with a light-shielding material deposited thereon, which are bonded together.

In the above-mentioned method, before slices of FOB 31 (each referred to as "sliced FOB" hereinafter) are bonded together, it is preferred that a light-shielding material (e.g., Cr) be deposited thereon. FIG. 8 is an enlarged partially sectional view showing a configuration of thus produced FOB. As depicted, this FOB has light-shielding material layers 44 disposed on both sides of each adhesive layer 40, since the sliced FOBs are bonded together after the light-shielding material is deposited on their sliced faces. When the sliced FOB is too thin, its capacity for eliminating the disturbing light may decrease. Such decrease, however, can be compensated for when the sliced face of the sliced FOB is coated with a light-shielding material as mentioned above.

The FOB of the present invention may be made not only by a method in which sliced FOBs are bonded together as mentioned above but also by a method in which a flat upper surface of a columnar FOB is shaved, ground, etched, and so on. In the latter method, in addition to the above-mentioned FOB 1, an FOB having an input end face shaped differently from the input end face 2 of the FOB 1 can be made. In the following, such an example of FOB will be explained with reference to FIGS. 9A, 9B, 10A, and 10B.

Figure 9A:
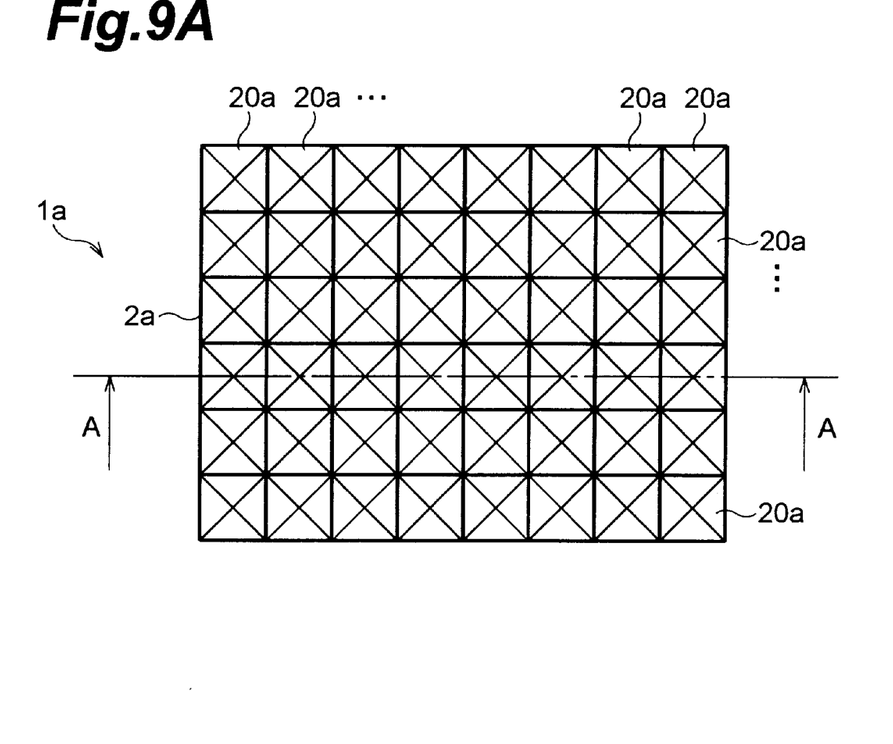
FIG. 9A is a plan view showing an FOB 1a of a second embodiment.
Figure 9B:
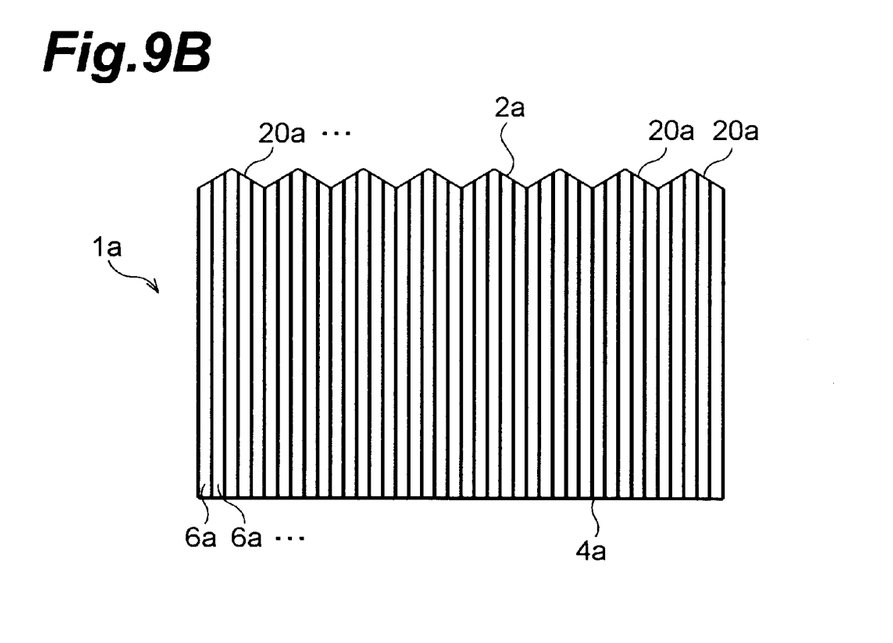
FIG. 9B is a schematic sectional view of the FOB 1b taken along line A—A of FIG. 9A.

FIG. 9A is a plan view showing an FOB 1a in accordance with a second embodiment, whereas FIG. 9B is a schematic sectional view of the FOB 1a taken along line A—A of FIG. 9A. In these drawings, elements corresponding to those of the FOB 1 in the first embodiment are referred to with numerals denoting the same, with a suffix "a" added thereto.

This FOB 1a has an input end face 2a formed by a plurality of quadrangular-pyramid-like ridge portions 20a arranged into a matrix. Each slope of these ridge portions 20a is inclined at the above-mentioned slant angle ($<\alpha_c$) corresponding to the kind of unit fibers 6a, i.e., whether there is a cladding or not. Also, its output end face 4a is a flat surface perpendicular to the axis of each unit fiber 6a.

The input end face may be formed not only by the quadrangular pyramids such as those of this embodiment but also by any polygonal-prism-like ridge portions, such as triangular-prism-like ridge portions, which are arranged two-dimensionally.

Figure 10A:
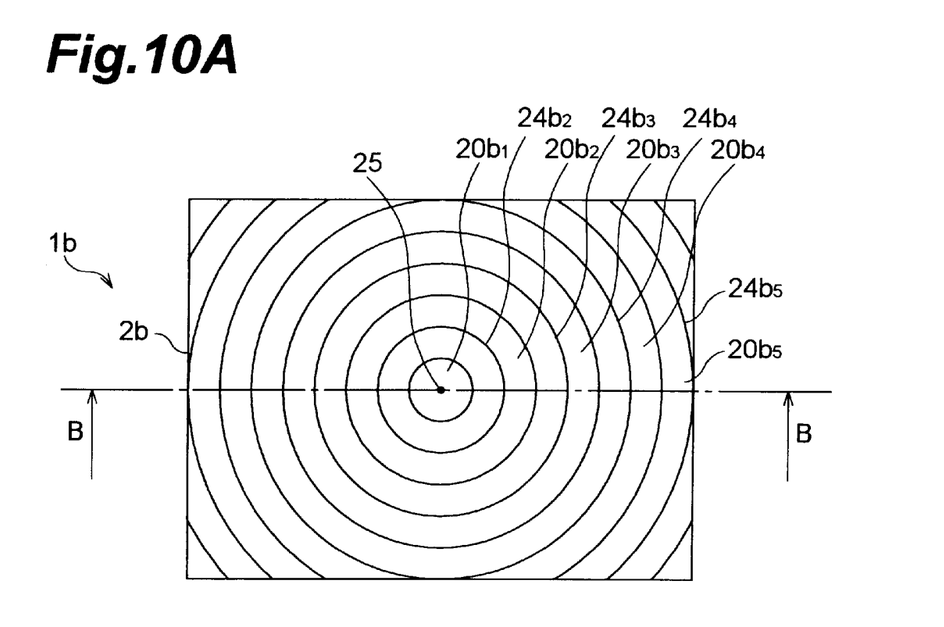
FIG. 10A is a plan view showing an FOB 1b of a third embodiment.
Figure 10B:
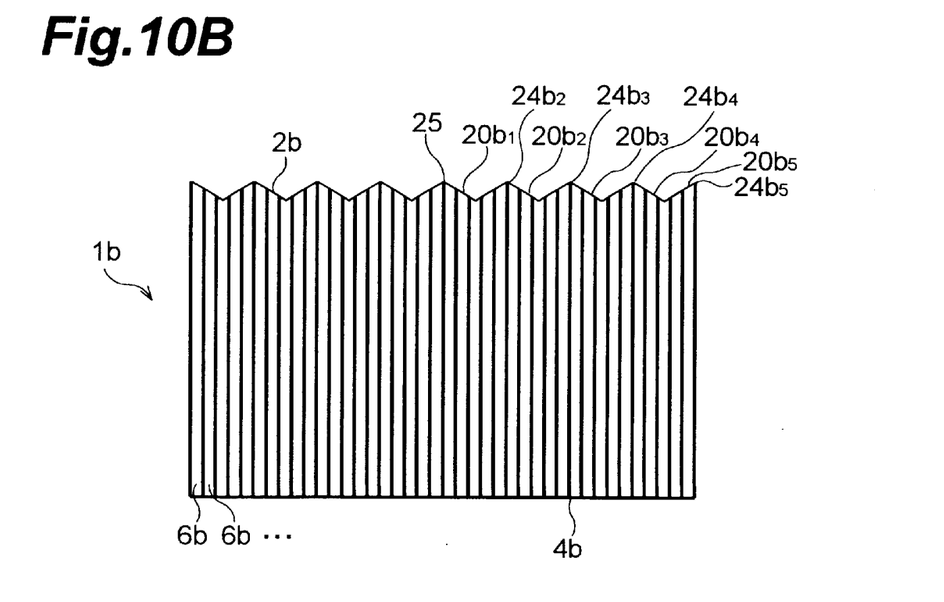
FIG. 10B is a schematic sectional view of the FOB 1b taken along line B—B of FIG. 10A.

FIG. 10A is a plan view showing an FOB 1b in accordance with a third embodiment, whereas FIG. 10B is a schematic sectional view of the FOB 1b taken along line B—B of FIG. 10A. In these drawings, elements corresponding to those of the FOB 1 in the first embodiment are referred to with numerals denoting the same, with a suffix "b" added thereto.

Among ridge portions $20b_1$ to $20b_5$ which form an input end face 2b of this FOB 1b, the ridge portion $20b$ is formed like a cone having an apex 25, whereas the other ridge portions $20b_2$ to $20b_5$ have ring-like forms with their respective circular apexes $24b_2$ to $24b_5$. The ridge portions $20b_1$ to $20b_5$ are arranged such that the apexes $24b_2$ to $24b_5$ of the ridge portions $20b_2$ to $20b_5$ respectively constitute concentric circles, while the apex 25 of the ridge portion $20b_1$ is positioned at the center of these concentric circles. Each slope of these ridge portions $20b_1$ to $20b_5$ is inclined at the above-mentioned slant angle ($\leq \alpha_c$) corresponding to the kind of unit fibers 6b, i.e., whether there is a cladding or not. Also, its output end face 4b is a flat surface perpendicular to the axis of each unit fiber 6b.

Each of the FOBs having such input end faces as those shown in FIGS. 9 and 10 constitutes the input end face by surfaces inclined at a slant angle by which disturbing light from within the air can be eliminated, while having an output end face perpendicular to the axis of the unit fiber, thereby yielding advantageous effects similar to those of the FOB 1 of the first embodiment.

From the invention thus described, it will be obvious that the invention may be varied in many ways. Such variations are not to be regarded as a departure from the spirit and scope of the invention, and all such modifications as would be obvious to one skilled in the art are intended for inclusion within the scope of the following claims.

The basic Japanese Application No. 8-324343 (324343/1996) filed on Dec. 4, 1996 is hereby incorporated by reference.

What is claimed is:

1. A fiberoptic block comprising a plurality of unit fibers which are bundled together such that respective axes thereof are substantially parallel to each other, both end faces of said unit fibers being respectively collected together to form input and output end faces;

wherein said input end face is formed by a plurality of ridge portions arranged, each of said ridge portions having a slope inclined with respect to the axis of each of said unit fibers;

wherein an angle of inclination of said slope of each of said ridge portions is an angle at which light incident on each of said unit fibers from within the air by way of said slope is prevented from being propagated through said unit fiber;

wherein tops of said ridge portions are flush with a plane orthogonal to the axis of each of said unit fibers; and wherein said output end face is a surface orthogonal to the axis of each of said unit fibers.

2. A fiberoptic block according to claim 1, wherein each of said unit fibers comprises a core having a predetermined refractive index and serving as a light propagating region, a cladding closely surrounding said core and having a refractive index lower than that of said core, and a light absorber closely surrounding said cladding and exhibiting a high absorptance with respect to a light component with a transmission wavelength of said core; and wherein the angle of inclination of said slope of each of said ridge portions is an angle at which light incident on said unit fiber from within the air by way of said slope is prevented from being totally reflected within said unit fiber.

3. A fiberoptic block according to claim 1, wherein each of said unit fibers comprises a core having a predetermined refractive index and serving as a light propagating region, and a light absorber closely surrounding said core and absorbing light from said core; and wherein the angle of inclination of said slope of each of said ridge portions is an angle at which light incident on said unit fiber from within the air by way of said slope is caused to advance in a direction deviating from the axial direction of said unit fiber.

* * * * *